Figure 2:
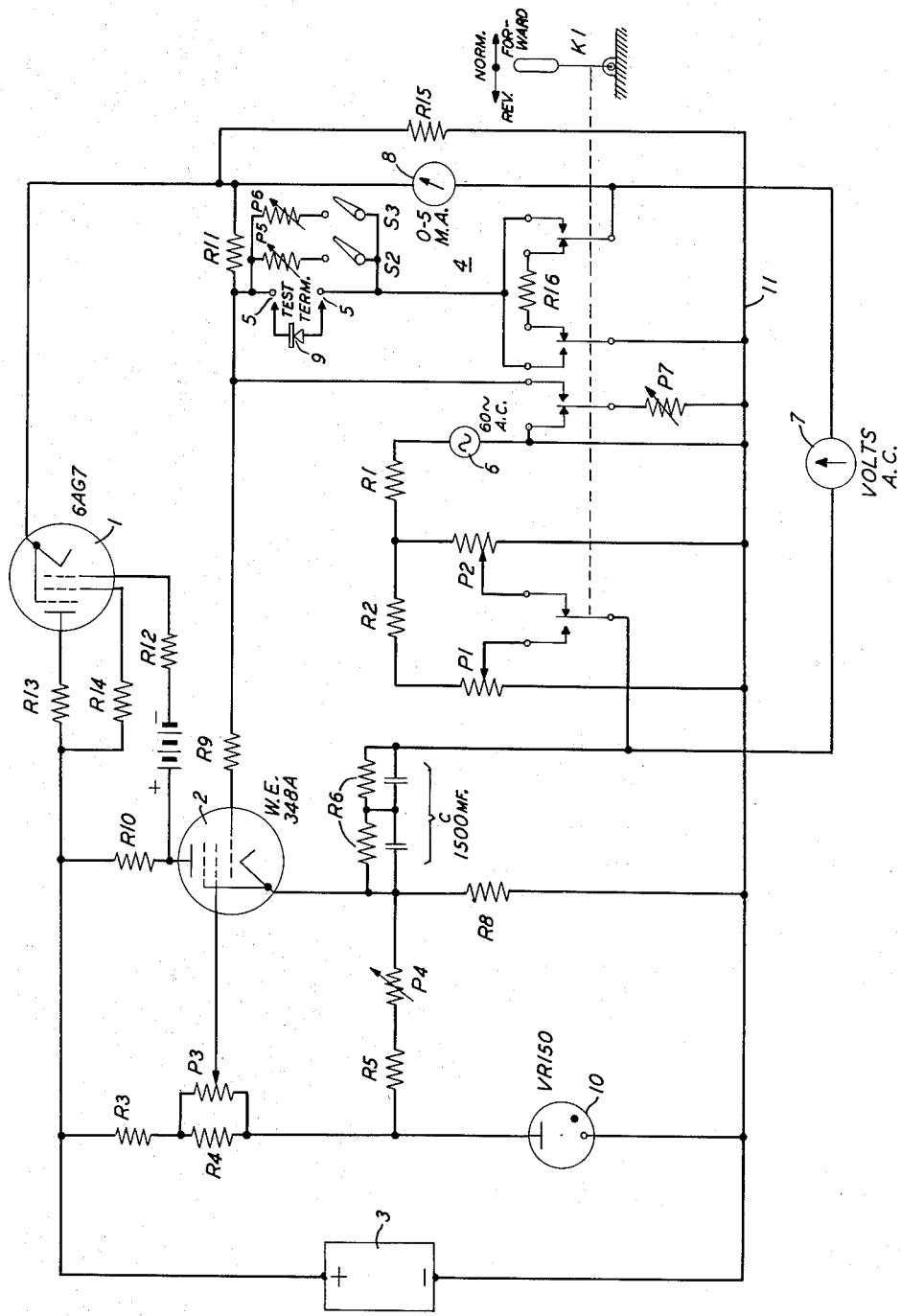

June 5, 1956 R. R. BLAIR 2,749,512
OHMMETER
Filed Aug. 23, 1952 2 Sheets-Sheet 1
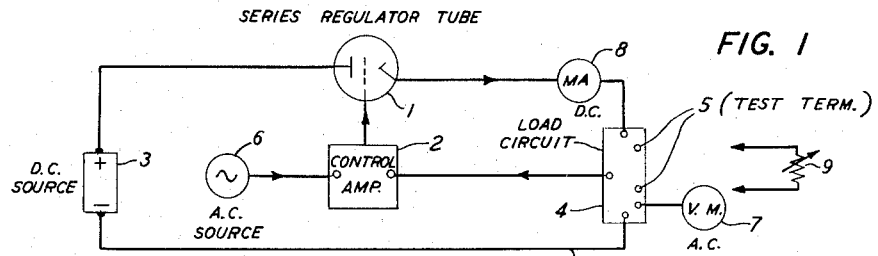
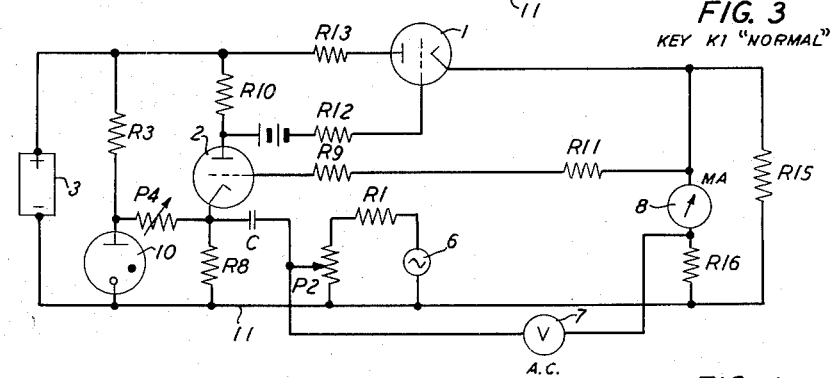
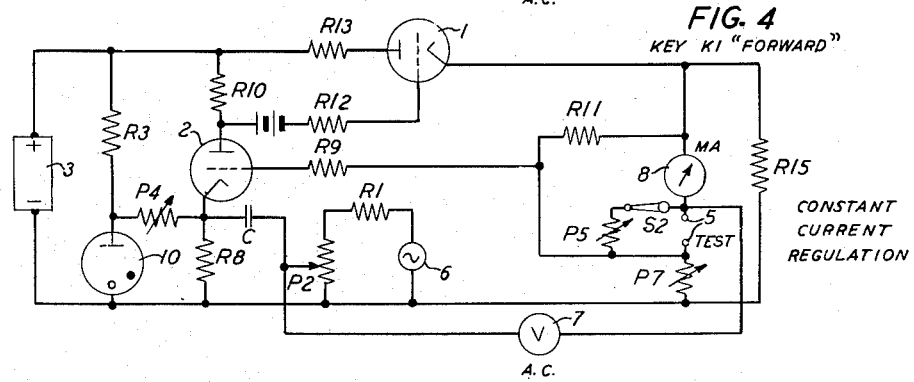
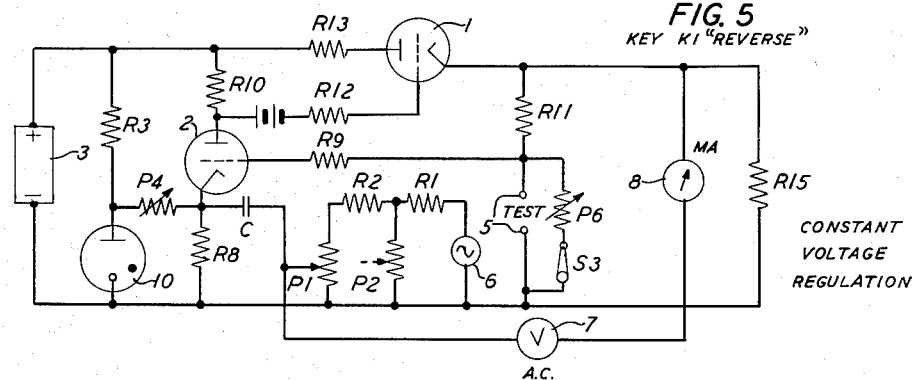
INVENTOR
R. R. BLAIR
BY
Walter M. Hiel
ATTORNEY INVENTOR
R. R. BLAIR
BY
Walter M. Hill
ATTORNEY

# United States Patent Office 2,749,512
Patented June 5, 1956

2,749,512

OHMMETER

Royer R. Blair, Berkeley Heights, N. J., assignor to Bell Telephone Laboratories, Incorporated, New York, N. Y., a corporation of New York Application August 23, 1952, Serial No. 306,023

11 Claims. (Cl. 324—64)

This invention relates to the art of electrical measuring and more particularly to an ohmmeter adapted for measuring the alternating-current resistance of a non-linear resistor.

It is a well-known fact that the alternating-current resistance, sometimes termed variational resistance or dynamic resistance, of a non-linear resistor is of a very different value than its direct-current or static resistance. Moreover, the alternating-current resistance of such a resistor is always dependent upon either the direct current flowing through it or the direct voltage impressed across its terminals. Therefore, in referring to this alternating-current resistance, either the direct current or the direct voltage must be specified. This current or voltage at which the alternating-current resistance is determined is frequently called the bias current or bias voltage.

Where the non-linear resistor is also asymmetric so as to have a different current-voltage characteristic in one direction of current flow than in the other, it is generally desirable that the measurement be made under standardized direct-current bias conditions for one direction of current flow while for the reverse direction, the measurements are made under standardized conditions of impressed direct-voltage bias. Semiconductor rectifiers are well-known examples of such asymmetric, non-linear resistors. It will be evident from a consideration of the static current-voltage characteristics of such rectifiers that the best control in the "forward" or low resistance direction is obtained by measuring under constant current bias conditions. In the "reverse" direction, the best control throughout the low current range is obtained by measuring under constant voltage bias conditions. The alternating-current resistance of the asymmetric, non-linear resistor is usually widely different in the forward and reverse directions of current flow. Therefore, they are conveniently distinguished by designating them the "forward" and "reverse" alternating-current resistances, respectively. If the non-linear resistor is symmetrical, as for example it is a silicon carbide varistor as described in the Bell Laboratories Record, July 1940, page 322, Fig. 4, the terms "forward" and "reverse" have no meaning and the measurements may be made under either constant current or constant voltage conditions, whichever is found the better.

The alternating-current resistance of non-linear resistors may be measured in several ways. One method is to use a bridge. If the resistor is asymmetric, its reverse resistance frequently falls in a range requiring special care in grounding and shielding of leads and the various components of the bridge. Due to the circuit configuration of a bridge it is very difficult to perform forward resistance measurements at constant direct current and reverse resistance measurements at constant direct voltage. In order to perform such measurements on a bridge at all, it is mandatory that the current and voltage, respectively, for the two conditions of test be manually adjusted for each successive test. This would obviously consume a great deal of time and frequently results in questionable accuracy.

Another method of test which could be employed would be to make two-point direct-current measurements to determine the slopes of the forward and reverse voltage-current characteristics about the required bias points. This method would be still slower than the bridge method and except for certain laboratory procedures would be entirely unsuited for commercial purposes.

A third method of measurement would be to employ some form of alternating-current ohmmeter wherein a superimposed direct current is passed through the resistor under test or a superimposed direct voltage is impressed thereon. While this method may work well in measuring the forward resistance, it would require individual setting of the bias for each resistor when making reverse resistance measurements. In general, it would be troublesome wherever measurements of high resistance material must be made at constant direct voltage.

It is an object of this invention to avoid the foregoing disadvantages and to provide a means for quickly measuring the alternating-current resistance of a non-linear resistor under either constant direct current or constant direct voltage conditions, which conditions are automatically maintained.

A further object is to provide a means for measuring both the forward and reverse alternating-current resistances of a non-linear, asymmetric resistor.

A still further object is to provide a circuit means whereby an asymmetric, non-linear resistor may be tested for its forward and reverse alternating-current resistances above and below, respectively, predetermined limits.

The foregoing objects are achieved by this invention which provides a means for connecting a non-linear resistor to be tested into the load circuit of a conventional automatic voltage regulation circuit comprising a series regulator tube and a control amplifier tube. A source of alternating voltage provides a signal for the control amplifier whereby an alternating current is caused to flow through the load circuit. An alternating-current voltmeter is connected to the load circuit, the readings whereof are a measure of the alternating-current resistance of the resistor under test.

The invention may be better understood by referring to the accompanying drawings in which:

Fig. 1 discloses the invention in block diagram, showing the essential elements of a preferred embodiment of the invention;

Fig. 2 is a more complete circuit diagram of a preferred embodiment of the invention; and Figs. 3, 4 and 5 show the circuits set up by the apparatus of Fig. 2 due to the three positions of key K1.

Referring now to Fig. 1, a series regulator tube 1, shown schematically as a triode, is connected in series with a direct-current source 3 and a load circuit 4. A control amplifier 2 has its input circuit connected to the load circuit and its output circuit to the series regulator tube. The circuit thus far described is conventional in the voltage regulation art and is substantially identical with the circuits disclosed in United States Patent Re. 21,749, granted March 11, 1941, to A. W. Vance and the circuits disclosed in United States Patent 2,127,822 granted August 23, 1938, to W. R. Koch.

For the purposes of the present specification, it may be merely mentioned that such regulator circuits operate to maintain a substantially constant voltage across some portion of the load circuit. In Fig. 1, the voltage across the portion of the load circuit between the input lead to the control amplifier 2 and conductor 11 is maintained substantially constant due to the regulating action of the circuit. For example, should the current in the load circuit lower for any reason, the voltage drop impressed on the input circuit of control amplifier 2 will correspondingly lower, thereby decreasing the impedance of the series regulator tube. This in turn increases the current from source 3 through the load 4 to return the voltage across the input circuit of the control amplifier 2 to substantially its original value.

In employing this circuit in the practice of this invention, test terminals 5 are provided in the load circuit to which may be connected a non-linear resistor 9 to be measured. If it is desired that the measurement be made under constant direct-current conditions, the connections are so made, as more particularly hereinafter described, that a constant direct voltage is maintained across a linear resistor connected in series with test resistor 9. On the other hand, if the measurement is to be made with a constant direct voltage across the resistor under test, the voltage across the resistor under test is itself applied to the input circuit of the control amplifier.

In order to superimpose an alternating current upon the direct current through the resistor under test, this invention connects an alternating-current source 6 to the input circuit of the control amplifier 2. This will cause an alternating variation of voltage to be applied to the control grid of the series regulator tube which in turn will produce the required alternating current in the load circuit and consequently through the resistor under test. A voltmeter 7 is connected to the load circuit for measuring the alternating voltage across a portion thereof which can be shown to be a measure of the alternating-current resistance of the non-linear resistor.

Fig. 2 discloses a practical embodiment of the invention in which the several reference numbers found in Fig. 1 refer to corresponding parts in Fig. 2. Here the series regulator tube 1 is shown as a pentode which may conveniently be a commercially obtainable tube of the 6AG7 type. The control amplifier 2 is also disclosed as a pentode, and, for example, may be a Western Electric 348A tube. The source of direct current 3 is shown connected in series with the regulator tube 1 and a load circuit network 4, the return to the power source being by way of conductor 11. The suppressor grid of tube 1 is connected directly to the cathode in accordance with conventional practice and the screen grid is connected to the positive supply source by way of a resistor R14. The control grid of tube 1 is connected to the plate of the control amplifier tube through resistor R12. The bias battery connected in this circuit path is to offset the positive potential that would otherwise be applied to the control grid of tube 1. The control tube 2 is connected across the direct-current source 3 through a plate resistor R10 and a cathode resistor R8. The suppressor grid of this tube is also connected to its cathode and the screen grid is connected to the direct-current source through a potenial divider comprising the gaseous voltage regulator 10, a resistor R3 and potentiometer P3. The purpose of potentiometer P3 is to provide an adjustment which will eliminate load current variations due to variations in voltage from the power supply 3. The control grid of amplifier 2 is connected to the load circuit through a resistor R9. The resistance of R11 is preferably of the same order as the reverse resistances to be measured. A resistance of 500,000 ohms works well when measuring Western Electric type 400G germanium varistors.

The amount of direct current initially permitted to flow through the load circuit can be controlled by a variable resistor P4 which varies the voltage drop across resistor R8 and hence determines the impedance of amplifier 2 and the voltage applied to the grid of the series tube 1.

A key K1 is associated with a pluraliy of switches schematically illustrated as of the single-pole, double-throw type. This key may assume any one of three positions as indicated by the double-headed arrow and the legends directly above the key control lever. Each of these three positions sets up different circuits for calibration and test as will be more particularly dscribed in connection with Figs. 3, 4 and 5. The terms "Forward" and "Reverse" refer to the forward and reverse directions of an asymmetric test resistor. If the non-linear test resistor is bilateral, these terms have no direct significance but the switch positions refer to constant current and constant voltage test conditions, respectively.

Milliammeter 8 is included in the load circuit for measuring the direct current flowing through the resistor under test and is also used with resistor R16 for adjusting the load voltage to a predetermined level.

An alternating-current voltmeter 7, which may be conveniently of the high input impedance vacuum type, is connected to the load circuit for measuring the alternating voltage developed either across the resistor under test or a resistor connected in series therewith, depending upon the specified test conditions.

The alternating signal voltage is supplied from a source 6 through a network of resistors R1, R2 and potentiometers P1, P2 and a capacitor C. The voltage of source 6 may have a frequency in the commercial range such as, for example, 60 cycles per second. It is, therefore, necessary that capacitor C be rather large and to avoid exceeding its voltage rating, it is convenient to connect two large capacitors in series as shown in Fig. 2. Each of the two capacitors may, for example, have a capacity of 3,000 microfarads. In order to equalize the charge on these two capacitors, a pair of resistors, R6, is connected as shown. Aside from this function of equalizing the charge, these resistors have no other significance in the circuit.

The apparatus of Fig. 2 is set up and calibrated for testing asymmetric resistors by observing the following steps: With key K1 in the "Normal" position as shown in Fig. 2, the circuits of Fig. 3 are established. Reference may now be made to Fig. 3 where all elements not in circuit have been deleted for the sake of clarity. With the circuits thus set up, variable resistor P4 is adjusted until the milliammeter 8 reads a predetermined value, for example 5 milliamperes. If resistor R16 is made 1,000 ohms, this will provide a direct voltage across the load circuit of substantially 5 volts, which will be the voltage at which the test resistors are to be measured. If a different voltage is specified, P4 is adjusted until meter 8 reads that voltage. It will be understood that the automatic regulator action will be such as to maintain this voltage constant irrespective of resistance variations in the load circuit. The load circuit now comprises resistors R15 and R16 in parallel.

Switch S2 of Fig. 2 is now closed and variable resistor P5 is adjusted to a predetermined resistance value corresponding with the maximum forward resistance of the asymmetric resistor, which resistance may vary with temperature. Consequently, for routine shop tests, this resistor P5 may be calibrated in terms of temperature for any particular kind of test resistor.

The key K1 is now operated to the "Forward" position, thus setting up the circuits of Fig. 4. The forward resistance is relatively small compared with R11 so the resistance of R11 may be neglected in Fig. 4. Variable resistor P7 is then adjusted until the milliammeter reads a predetermined current; for example 3 milliamperes. This is assumed to be the direct-current bias at which the test resistor is to be measured. From the previous adjustment of P4 to maintain a load voltage of 5 volts, it will be evident that the direct voltage across P7 will be substantially 5 volts irrespective of the adjustment of its resistance. This means that once P7 is adjusted, the direct current will remain at 3 milliamperes even though test resistors of widely different resistances are substituted for P5.

Potentiometer P2 is next adjusted to provide a predetermined alternating voltage across resistor P5 as read by meter 7. It will be noted that while meter 7 is not shown connected directly across resistor P5, the meter will correctly indicate only the voltage across resistor P5. This will become evident when it is understood that the regulator circuit provides an alternating voltage component across P7 substantially equal to the alternating voltage drop across the lower portion of potentiometer P2. These voltages are in opposite phase in so far as meter 7 is concerned and they therefore balance. Consequently meter 7 measures only the alternating voltage across the test terminals, which voltage is directly proportional to the alternating-current resistance of the test resistor. The regulator circuit can be made to provide a balancing voltage across P7 substantially equal to the voltage across P2 by merely selecting the circuit parameters during the design to provide sufficient gain to accomplish this end. For example, for the specific regulator circuit and tubes shown, this gain is provided if the resistances of P5, P7, R15 and R10 are made 200 ohms, 2,000 ohms, 5,000 ohms and 200,000 ohms, respectively. The equality of these voltages is substantially unaffected by any normal variations in the resistance of P5 or in the alternating-current resistance of the non-linear element which may replace it during subsequent tests. The connections shown are usually necessary where the voltmeter is supplied from an alternating-current source because capacities within the voltmeter couple the alternating power source to the meter circuit to inject an additional voltage across resistor P7, thereby causing the meter to read incorrectly. If a battery operated electronic voltmeter is used for meter 7, it can be connected directly across resistor P5 without the above-mentioned difficulty.

Potentiometer P2 adjusts the alternating signal voltage applied across resistor R8 through capacitor C. The feedback provided by the circuit maintains an alternating voltage across P7 substantially equal to that applied to resistor R8 by potentiometer P2. Therefore, the alternating current through P5 (and the test resistors which will be substituted for it) will remain substantially constant. Voltmeter 7 will, therefore, respond directly proportional to the alternating-current resistance of the test resistor. If that resistance is less than the calibrating resistance of P5, meter 7 will read less than the predetermined voltage established by this adjustment. Since the forward resistance should be not greater than the limiting value selected for P5, all test resistors yielding a reading on meter 7 less than this value successfully pass the test.

Switch S2 is now opened and switch S3 is closed. Variable resistor P6 of Fig. 2 is then adjusted to correspond with the lowest limiting resistance value of an asymmetric resistor in its reverse direction at a predetermined temperature.

Key K1 is then moved to the "Reverse" position, thereby establishing the circuits of Fig. 5. The load circuit now comprises resistors R11 and P6 in series and with R15 in parallel. With this circuit arrangmeent, the voltage across the test terminals 5 is maintained at substantially 5 volts. Potentiometer P1 is then adjusted to provide a signal voltage across the load circuit corresponding to a predetermined value which may be conveniently made equal to the same voltage established by the adjustment of potentiometer P2 for the forward direction in Fig. 4. Switch S3 is now opened.

It should again be emphasized that both in Fig. 4 and in Fig. 5 the alternating voltage measured by voltmeter 7 is the voltage drop appearing across a resistor in the load circuit. For example, in Fig. 4 this alternating voltage was described as being substantially equal to the voltage appearing directly across P5 and the test terminals. In Fig. 5, voltmeter 7 similarly measures the voltage drop across resistor R11 in the load circuit and therefore its reading is proportional to the current flowing through the test resistor. In this case the reading is inversely proportional to the alternating-current resistance of the test resistor. Due to the very much higher reverse current test resistances usually encountered, it is even more important that the meter 7 be connected to potentiometer P1 instead of to the lower terminal of R11.

Having set up the circuits as described, it is now only necessary to return key K1 to its "Normal" position and insert the non-linear resistors to be tested across the test terminals. An asymmetric resistor such as resistor 9 in Fig. 2 should be connected so that its forward direction is from the lower to the upper test terminal as indicated. To test such a resistor, it is only necessary for the operator to move the key K1 to the "Forward" direction and then to the "Reverse" direction. If it is found that the alternating voltage reading from meter 7 does not exceed the predetermined limits established during calibration, the resistor passes its test. The reason that the same limits can be used for both the forward and reverse resistances is due to the fact that their limit requirements are opposite. The reverse resistance is specified to have a lower limit whereas the forward resistance is specified to have an upper limit. When testing asymmetric resistors, these limits are caused to merge to a single reading on the voltmeter 7 by the separate adjustments of potentiometers P1 and P2 as described. In the alternative, the apparatus can be made to measure the actual resistance. Since meter 7 responds to the forward resistance in direct proportion, and to the reverse resistance in inverse proportion, the actual resistance can be read thereon by calibrating its scale to read in ohms.

If the resistor to be tested is not asymmetric, only one of the measurements need be made, depending upon whether it is desired to measure the resistor at a constant direct voltage or at a constant direct current. If it is desired to measure the resistor with a constant direct current, the measurement is made with key K1 in the "Forward" direction, thereby setting up the circuits of Fig. 4. If the measurements are to be made with a constant direct voltage, the key is moved to the "Reverse" position setting up the circuits of Fig. 5. Meter 7 can be calibrated to directly read the alternating-current resistance for either case, the calibration being somewhat similar to that employed in conventional ohmmeters.

It is evident that various modifications may be made without departing from the scope of this invention. Other forms of automatic voltage regulator circuits are known and may be substituted for the specific one herein disclosed without altering the invention in any substantial way.

What is claimed is:

1. Apparatus for measuring the alternating-current resistance of a non-linear resistor under uniform direct-current conditions comprising an automatic voltage regulator circuit of the type having a series regulator tube and a control amplifier, a space current path and a control electrode for said regulator tube, a load circuit including a pair of test terminals for said resistor, a source of direct current and a circuit connecting said source in series with the space current path and load circuit, an input circuit and an output circuit for said control amplifier, a circuit connecting said output circuit to said control electrode and another circuit connecting said load circuit to said input circuit whereby a direct voltage in said load circuit is maintained substantially constant, a source of alternating current coupled to said input circuit whereby an alternating current flows in said load circuit, and a meter connected to said load circuit for measuring the alternating-voltage drop across a portion thereof as a measure of the alternating-current resistance of said resistor.

2. Apparatus for measuring the alternating-current resistance of a non-linear resistor under uniform direct-current bias conditions comprising an automatic voltage regulator circuit of the type having a series regulator tube and a control amplifier, said amplifier having input and output circuits, a load circuit including a pair of test terminals for said resistor, a source of direct current connected in series with said series tube and said load circuit, means connecting the amplifier input circuit to said load circuit and the amplifier output circuit to the series tube whereby a direct voltage in said load circuit is maintained substantially constant, a source of alternating current coupled to the amplifier input circuit whereby an alternating current flows in the load circuit, and a meter connected to said load circuit for measuring the alternating-voltage drop across a portion thereof as a measure of said alternating-current resistance.

3. Apparatus for measuring the alternating-current resistance of a non-linear resistor under uniform direct-current bias conditions comprising an automatic voltage regulator circuit of the type having a series regulator tube and a control amplifier, said amplifier having input and output circuits, a load circuit comprising a resistor and a pair of test terminals connected in series, a source of direct current connected in series with said series tube and said load circuit, means connecting the amplifier input circuit across a portion of said load circuit and the amplifier output circuit to the series tube whereby a direct voltage across the said load circuit portion is maintained substantially constant, a source of alternating current coupled to the amplifier input circuit whereby an alternating current flows in the load circuit, and a meter effectively connected across the remaining portion of said load circuit for measuring the alternating-voltage drop thereacross as a measure of said alternating-current resistance.

4. Apparatus for measuring the alternating-current resistance of a non-linear resistor while carrying a constant direct current comprising an automatic voltage regulator circuit of the type having a series regulator tube and a control amplifier, said amplifier having input and output circuits, a load circuit comprising a resistor and a pair of test terminals connected in series, a source of direct current connected in series with said series tube and said load circuit, means connecting the amplifier input circuit across the series-connected resistor in said load circuit and the amplifier output circuit to the series tube whereby a constant direct voltage is maintained across said series resistor, a source of alternating current coupled to the amplifier input circuit whereby an alternating current flows in the load circuit, and a meter effectively connected across the test terminals for measuring the alternating-voltage drop in a test resistor which may be connected thereto, said measured alternating-voltage drop being a measure of said alternating-current resistance.

5. Apparatus for measuring the alternating-current resistance of a non-linear resistor while carrying a constant direct current comprising an automatic voltage regulator circuit of the type having a series regulator tube and a control amplifier, said amplifier having input and output circuits, a load circuit comprising a resistor and a pair of test terminals connected in series, a source of direct current connected in series with said series tube and said load circuit, means connecting the amplifier input circuit across the series-connected resistor in said load circuit and the amplifier output circuit to the series tube whereby a constant direct voltage is maintained across said series resistor, a source of alternating current coupled to the amplifier input circuit whereby an alternating current flows in the load circuit, and a meter connected directly to one of said test terminals and to a point in the circuits of said apparatus having substantially the same alternating potential as the other of said test terminals whereby the indications of said meter are a measure of said alternating-current resistance.

6. Apparatus for measuring the alternating-current resistance of a non-linear resistor while maintaining a constant direct voltage thereacross comprising an automatic voltage regulator circuit of the type having a series regulator tube and a control amplifier, said amplifier having input and output circuits, a load circuit comprising a resistor and a pair of test terminals connected in series, a source of direct current connected in series with said series tube and said load circuit, means connecting the amplifier input circuit across said test terminals and the amplifier output circuit to the series tube whereby a constant direct voltage is maintained across a test resistor which may be connected to said test terminals, a source of alternating current coupled to the amplifier input circuit whereby an alternating current flows in the load circuit, and a meter effectively connected across the series resistor in said load circuit for measuring the alternating-voltage drop thereacross as a measure of said alternating-current resistance.

7. Apparatus for measuring the alternating-current resistance of a non-linear resistor while maintaining a constant direct voltage thereacross comprising an automatic voltage regulator circuit of the type having a series regulator tube and a control amplifier, said amplifier having input and output circuits, a load circuit comprising a resistor and a pair of test terminals connected in series, a source of direct current connected in series with said series tube and said load circuit, means connecting the amplifier input circuit across said test terminals and the amplifier output circuit to the series tube whereby a constant direct voltage is maintained across a test resistor which may be connected to said test terminals, a source of alternating current coupled to the amplifier input circuit whereby an alternating current flows in the load circuit, and a meter connected directly to one end of the series resistor in said load circuit and to a point in the circuits of said apparatus having substantially the same alternating potential as the other end of said series resistor whereby the indications of said meter are a measure of said alternating-current resistance.

8. The combination of claim 1 with a calibrating resistor of known resistance and a means for connecting said calibrating resistor to the test terminals.

9. The combination of claim 2 with a calibrating resistor of known resistance and a means for connecting said calibrating resistor to the test terminals.

10. The combination of claim 3 with a calibrating resistor of known resistance and a means for connecting said calibrating resistor to the test terminals.

11. Apparatus for testing the forward and the reverse alternating-current resistance of an asymmetric non-linear resistor under predetermined direct-current bias conditions comprising an automatic voltage regulator circuit of the type having a series regulator tube and a control amplifier, said amplifier having input and output circuits, a load circuit comprising a pair of resistors and a pair of test terminals, a source of direct current connected in series with said series tube and said load circuit, means connecting said amplifier output circuit to said series tube whereby a direct voltage in said load circuit is under control of said amplifier, a switch having a first position for connecting one of said pair of resistors in series with said terminals and for connecting the amplifier input circuit across said resistor whereby the direct voltage across said resistor is maintained substantially constant, a second position for said switch for connecting the other of said pair of resistors in series with said terminals and for connecting the amplifier input circuit across said terminals whereby the direct voltage across said terminals is maintained substantially constant, a source of alternating current coupled to the amplifier input circuit whereby an alternating current flows in the load circuit, and a meter effectively connected across a portion of said load circuit for measuring the alternating voltage drop thereacross as a measure of said alternating current resistances.

References Cited in the file of this patent

UNITED STATES PATENTS

| | | |
|---|---|---|
| 2,207,259 | Koch | July 9, 1940 |
| 2,444,014 | Williams | June 22, 1948 |
| 2,459,849 | Stateman | Jan. 25, 1949 |
| 2,546,039 | Moir | Mar. 20, 1951 |
| 2,585,121 | Hartman | Feb. 12, 1952 |